No. 12,311. REISSUED JAN. 31, 1905.

F. L. SMITH.

VALVE.

APPLICATION FILED JULY 19, 1904.

Witnesses:

H. S. Gaither

Fred G. Fischer

Inventor:

Frank L. Smith by Burton & Burton

Attorneys

No. 12,311. Reissued January 31, 1905.

UNITED STATES PATENT OFFICE.

FRANK L. SMITH, OF CHICAGO, ILLINOIS, ASSIGNOR, BY DIRECT AND MESNE ASSIGNMENTS, OF TWO-THIRDS TO ALVA C. RICKSECKER AND LEWIS A. NICHOLS, OF CHICAGO, ILLINOIS.

VALVE.

SPECIFICATION forming part of Reissued Letters Patent No. 12,311, dated January 31, 1905.

Original No. 749,637, dated January 12, 1904. Application for reissue filed July 19, 1904. Serial No. 217,275.

*To all whom it may concern:*

Be it known that I, FRANK L. SMITH, a citizen of the United States, residing at Chicago, in the county of Cook and State of Illinois, have invented new and useful Improvements in Valves, of which the following is a specification, reference being made to the accompanying drawings, forming a part thereof.

The purpose of this invention is to provide an improved form of construction of valves, particularly such as are made detachable from their operating-stems and connected with their stems in such manner that the rotation of the latter for forcing the valve to its seat does not rotate the valve, and in this particular form it is designed to afford more secure means of detachably connecting the valve and stem.

It consists in the features of construction which are set out in the claims.

Figure 1:
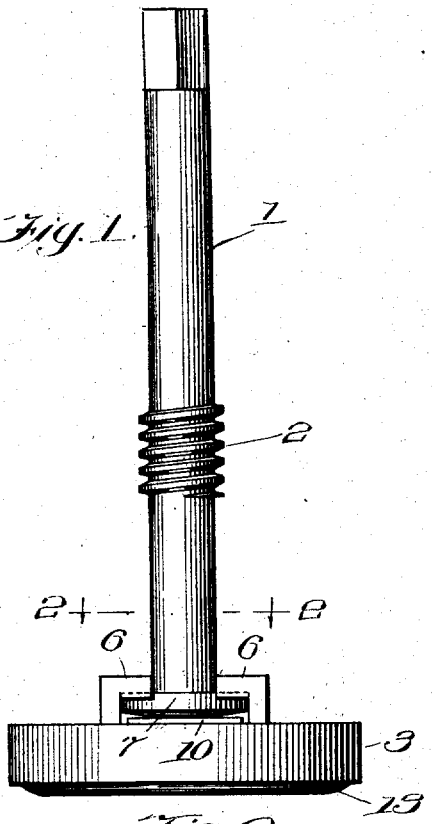
Figure 3:
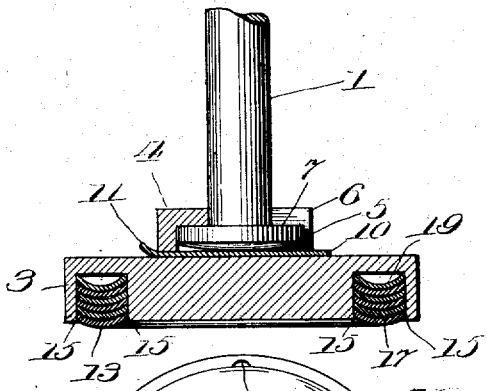
Figure 5:
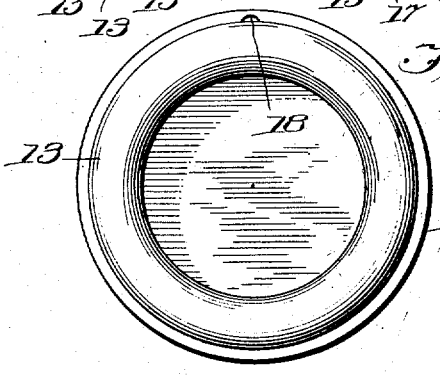
Figure 2:
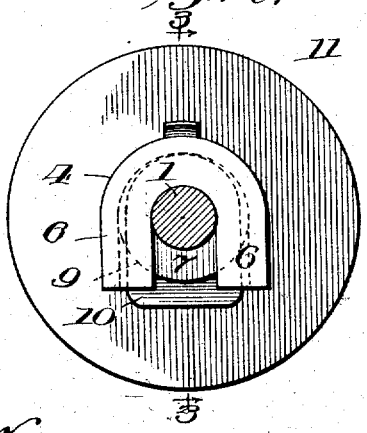
Figure 4:
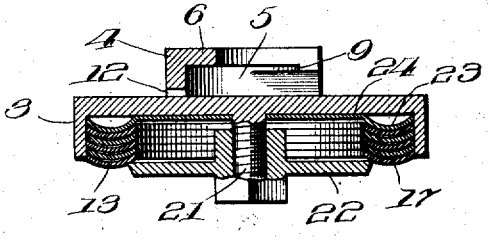

In the drawings, Figure 1 is a side elevation of my improved valve in its preferred form. Fig. 2 is a transverse section at the line 2 2 on Fig. 1. Fig. 3 is an axial section at the line 3 3 on Fig. 2. Fig. 4 is an axial section of the valve proper without the stem in a slightly-modified form. Fig. 5 is a face view of the valve seen in Figs. 1 and 3.

In the drawings I have shown a customary form of valve-stem 1, having the thread 2 for engagement with the valve-body to screw the valve down to its seat. This stem is adapted to be detachably engaged with the valve-head 3, the latter having a hub or boss 4 at the back, which is provided with a cavity 5, leading in from one side, overhung by an inner marginal flange 6 and adapted to admit the flange-terminal 7 of the valve-stem 1, which being introduced is accommodated in the cavity at a position at which the stem and valve-head are coaxial.

As thus far described the construction is familiar, but is objectionable in that the valve is free to escape laterally from the stem at one position, and must therefore be guided and retained otherwise than by the stem and must be handled carefully in removing in order to avoid dropping the valve-head and injuring it. I overcome this defect by cutting back the under side of the flange 6, forming a rabbet 9, which accommodates the flange-terminal 7, said rabbet being not extended laterally to the edge of the flange at the side at which the opening is formed through which the terminal flange of the valve-stem enters, but being limited to a circular form, so that when the valve-stem has been entered by the engagement of its flange-terminal under the flange 6 a short longitudinal movement engages the flange-terminal 7 in the rabbet 9 in such manner that lateral displacement is prevented. To prevent disengagement of the parts when thus engaged, I provide a key-plate 10, adapted to be inserted between the end of the valve-stem and the bottom of the cavity in the boss 4. This key-plate has a tongue 11, which protrudes through an aperture 12 cut through the boss opposite the lateral opening through which the valve-terminal enters, and the key-plate being made of suitably flexible material, preferably copper, the tongue 11 may be slightly bent up outside the boss after the key-plate is inserted, and thus held safely in place. The key-plate can be removed readily by straightening the tongue when it is desired to detach the valve-head from the stem.

The seating-face of my improved valve is formed of a metal disk 13, which is designed to be used instead of the rubber or asbestos rings which are customarily employed for such purposes and either detachably clamped to the valve or molded therein, according to the material. The disks 13 are preferably made of metal, such as copper, which will not tend materially to cut away the seat on which they are forced. I prefer to make the valve-head with an annular chamber 14, in which there may be lodged a plurality of annular copper disks concavo-convex in radial section and adapted to be nested, as seen in the axial sectional views, a sufficient number being thus lodged in the chamber to fill it and cause the outer one to protrude sufficiently to form an exteriorly convex seating-surface. To retain the disks whether nested as described or employed singly in a cavity of correspondingly less depth, I slightly undercut the sides of the annular cavity, leaving minute marginal flanges 15 15 at the edges. I make the annular disks 13 of such inner and outer diameters that they may be forced into the annular cavity by slight pressure past these minute flanges, somewhat as a watch-crystal is forced in the bezel, the outermost of the disks being thus engaged somewhat snugly under the flanges, the engagement being sufficient to retain them in place while the valve is introduced to its seat and screwed down. Once seating the valves firmly will expand the outer disk 13 so as to force both its edges out under the flanges 15 15 to an extent to make the engagement very secure. The disks being all formed with the same die and with the same convexity when nested as described they will come together at their circumferential margins, leaving a slight crescent-shaped cavity between them, as seen at 17 in the drawings, thus permitting the slight flattening of the outermost disk, which results from forcing the valve to its seat, expanding the disk so as to effect secure engagement at its circumference under the flanges 15 15, as described. At the same time the arch form will give an adequate degree of stiffness and some elastic reaction, sufficient to insure perfect seating even upon a slightly-uneven seat. To further increase this elastic resiliency and prevent the entire nest of disks from being flattened during the use of the first one, I prefer to employ a steel disk 19 at the back or bottom of the pile, which will uphold the softer copper disks. This steel disk may preferably be formed slightly more convex than the copper disks, so as to fully seat within them at the middle of the width of the ring. When the outermost disk has become worn so as to require a change, it may be removed by introducing any suitable tool under one margin at any point and stripping the outermost disk out from under the flanges 15. The other disks not having been expanded materially will be readily removed in the same way, and the disk which has been outermost being placed at the back of the pile a fresh disk is brought to the front and secured in the original manner under the flanges 15. The user is thus able to repair the valve quickly and completely as many times as there are disks in the nest or pile without expense, and at any time, even when only a single disk is used, the repair is easy and cheaply made, involving only the cost of a new disk. A slight recess 18 in one margin facilitates engaging the disks for removal.

In some forms of the valves it may be found preferable to secure the disks 13 by a removable element instead of by relying upon the expansion of the disks under the flanges 15, as described. In Fig. 4 I have shown a modification in this respect, consisting in forming at the center of the valve-body a threaded boss 21, which receives a clamping-plate 22, screwed onto the boss and pressing upon the inner marginal portion of the disks, binding them together in the cavity of the valve-head. In this form the bottom plate 23, of steel, is preferably made with only a central aperture sufficient to admit it onto the threaded boss, thus giving it a central flat portion 24 within the annual concavo-convex portion which supports the rings.

I claim—

1. A valve comprising a head and a removable annular concavo-convex metal disk lodged on the face of said head with the convex surface outward and positively supported on said head at the outer circumference of said annulus.

2. A valve comprising a head and a removable annular concavo-convex relatively soft-metal disk lodged on the face of said head with the convex surface outward and positively supported on the head back of the outer circumference of the annulus.

3. A valve comprising a head and a removable annular concavo-convex metal disk lodged on the face of said head with the convex surface outward, and positively supported on said head back of the outer circumference of the annulus, and means for centering and binding such annular disk to the head.

4. A valve comprising a chambered seating-face and a removable annular concavo-convex metal disk lodged in the face-chamber with the convex surface outward and the outer circumference positively supported by the bottom of the chamber.

5. A valve comprising a head and a removable annular concavo-convex metal disk lodged on the face of said head with the convex surface outward and positively and directly supported on said head at both its inner and outer circumference, and means for centering and binding such annular disk on the head.

6. A valve comprising a head having a chambered seating-face and a plurality of annular concavo-convex metal disks nested and lodged in the face-chamber with convex surface outward to form the seating-surface of the valve.

7. A valve comprising a head having its face provided with an annular chamber and an annular concavo-convex metal ring lodged in said chamber with its convex face outward, each circumferential margin of said chamber being slightly undercut to form a bezel, and said annular disk being engaged at its inner and outer circumferences respectively with said undercut margins, whereby the expansion of the annular disk by the pressure of the valve on its seat increases the engagement of the disk with such bezel.

8. A valve comprising a head, a hard-metal disk lodged and centered on the face of said head, having a concavo-convex annular portion with convex face outward, and a concavo-convex soft-metal disk lodged and centered on said concavo-convex annulus, and means for binding it thereto.

9. A valve comprising a head having a chambered face; a hard spring-metal disk lodged in such chamber comprising a concavo-convex annulus with convex face outward and a pile of soft-metal annular concavo-convex disks lodged and secured in the chamber resting on said hard-metal disk.

10. A valve comprising a head having an annularly-chambered face: a pile of annular concavo-convex metal disks nested and lodged in such annular chamber, the convex side outward, the circumferential walls of said annular chamber having at their outer edge minute inwardly-projecting flanges, the outermost of the disks being engaged behind the flanges.

11. A valve comprising a head having a chambered face; a hard spring-metal disk lodged in such chamber comprising a concavo-convex annulus with convex face outward, and a pile of soft-metal annular concavo-convex disks lodged and secured in the chamber resting on said hard-metal disk, the steel disk being slightly more convex than the soft-metal disk, to adapt it to support them at the middle.

In testimony whereof I have hereunto set my hand, in the presence of two witnesses, at Chicago, Illinois, this 11th day of July, 1904.

FRANK L. SMITH.

In presence of—
CHAS. S. BURTON,
FRED G. FISCHER.